United States Patent
Stanaland

(10) Patent No.: US 8,844,572 B2
(45) Date of Patent: Sep. 30, 2014

(54) DRAIN PIPE WASTE WATER CLOSURE PROTECTION DEVICE

(71) Applicant: Jay R. Smith Manufacturing Company, Montgomery, AL (US)

(72) Inventor: William Anthony Stanaland, Montgomery, AL (US)

(73) Assignee: Jay R. Smith Manufacturing Company, Montgomery, AL (US)

( * ) Notice: Subject to any disclaimer, the term of this patent is extended or adjusted under 35 U.S.C. 154(b) by 0 days.

(21) Appl. No.: 13/694,805

(22) Filed: Jan. 8, 2013

(65) Prior Publication Data

US 2013/0117921 A1 May 16, 2013

Related U.S. Application Data

(63) Continuation-in-part of application No. 12/928,812, filed on Dec. 20, 2010, now abandoned.

(51) Int. Cl.
*F16K 15/14* (2006.01)
*A47K 1/14* (2006.01)

(52) U.S. Cl.
CPC . *A47K 1/14* (2013.01); *F16K 15/14* (2013.01); *F16K 15/147* (2013.01)
USPC .......................................... 137/846; 137/849

(58) Field of Classification Search
CPC . F16K 15/147; E03C 1/298; A61M 2039/242
USPC ................................ 137/846, 849; 4/688, 682
See application file for complete search history.

(56) References Cited

U.S. PATENT DOCUMENTS

| | | | | | |
|---|---|---|---|---|---|
| 2,987,093 | A | * | 6/1961 | Urbon | 152/340.1 |
| 2,990,849 | A | * | 7/1961 | Peras | 137/515.7 |
| 3,707,986 | A | * | 1/1973 | Breen | 137/849 |
| 4,492,253 | A | * | 1/1985 | Raftis | 137/849 |
| 5,300,033 | A | * | 4/1994 | Miller | 604/167.03 |

* cited by examiner

*Primary Examiner* — Kevin Lee
*Assistant Examiner* — P. Macade Nichols
(74) *Attorney, Agent, or Firm* — William S. Ramsey

(57) ABSTRACT

An embodiment includes a drain pipe waste water closure protection device which allows passage of fluids through a drain into a pipe waste water closure and a waste water pipe while preventing backflow of fluid or gas from the waste water pipe and pipe waste water closure, as well as preventing evaporation of a water-containing pipe waste water closure located below the drain pipe waste water closure protection device in the waste water pipe. Embodiment drain pipe waste water closure protection devices are easily installed in existing or new drains. Embodiments have two radial disc seals which insure a strong seal between the drain pipe waste water closure protection device and the drain wall. Embodiments include a reinforcing band embedded below the radial disc seals which prevents failure of the radial disc seals.

Embodiments include a quadruple pressure accumulating seal which protects against the flow of gas or fluid from the waste water pipe.

3 Claims, 3 Drawing Sheets

DRAIN PIPE WASTE WATER CLOSURE PROTECTION DEVICE

CROSS-REFERENCE TO RELATED APPLICATIONS

This application claims the benefit of U.S. nonprovisional application Ser. No. 12/928,812, filed Dec. 20, 2010, abandoned herewith.

BACKGROUND OF THE INVENTION

Field of the Invention

Embodiments relate to drain pipe closure protection devices which are used in conjunction with waste water-containing, pipe closures.

In particular, the prior art does not provide a drain pipe waste water closure protection device with the advantages of embodiments of the present disclosure, that of allowing full flow through the drain, full access to the waste water-containing closure for maintenance, protection of the waste water-containing, closure from evaporation, and protection of the structure from the escape of sewer gas if the waste water-containing, closure fails.

BRIEF SUMMARY OF THE INVENTION

The following embodiments and aspects thereof are described and illustrated in conjunction with systems, tool and methods which are meant to be exemplary and illustrative, not limiting in scope. In various embodiments, one or more of the above-described problems have been reduced or eliminated, while other embodiments are directed to other improvements.

Embodiments include a drain pipe waste water closure protection device comprising a conical body having a drain water inlet and a drain water outlet. There is a corrosion resistant, radial compression cylinder embedded in the conical body near the inlet, the corrosion resistant, radial compression cylinder comprised of a strong, hard, resilient material. Two soft, flexible, resilient radial disc seals are located near the inlet of the conical body, the corrosion resistant, radial compression cylinder underlying the two radial disc seals. A quadruple pressure accumulating seal is located at the outlet of the conical body. All elements of the drain pipe waste water closure protection device except the compression cylinder manufactured of an elastomer imbibed with an adhesion prevention additive.

Embodiments also include a drain pipe waste water closure protection device which comprises a conical body having a drain water inlet and a drain water outlet. There is a radial compression cylinder embedded in the conical body near the drain water inlet comprised of stainless steel. Two radial disc seals are located near the drain water inlet of the conical body, and the radial compression cylinder is underlying the two radial disc seals. A quadruple pressure accumulating seal is comprised of four elliptical-parabolic double curved shaped pressure accumulating wall assemblies attached to the outlet of the conical body, each assembly comprised of an elliptical-parabolic double curved shaped pressure accumulating wall body comprised of a pressure accumulating wall shoulder, a left pressure accumulating section, and a right pressure accumulating section with a force accumulating outlet closure attached to each pressure accumulating section, wherein each force accumulating outlet closure is capable of interaction with an adjacent force accumulating outlet closure of an adjacent pressure accumulating wall body in a reversible sealing relationship. The conical body, radial disc seals, and quadruple pressure accumulating seal are collectively manufactured of a single piece elastomer imbibed with an adhesion prevention additive. The drain trap protection device is capable of mounting in a drain having a drain wall and the drain is attached to a waste water pipe. The radial disc seals are capable of having a sealing relationship with the drain wall, and the drain trap protection device is capable of allowing fluid flow through the drain into the waste water pipe when there is three ounces or more of water in the drain, and the drain pipe waste water closure protection device is capable of blocking backflow of gas or fluid from the waste water pipe into the drain when the pressure in the waste water pipe is equal to or higher than atmospheric pressure.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

Figure 3:
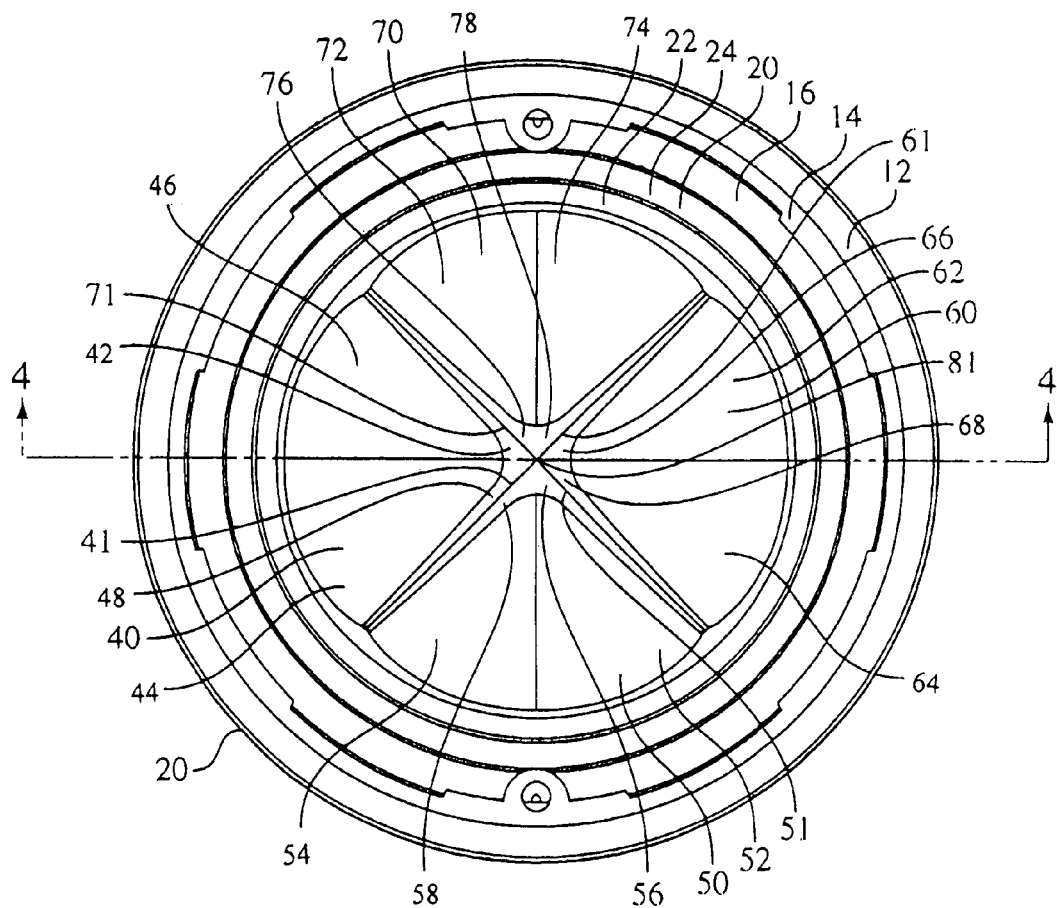

FIG. 3. is a top view of an embodiment drain pipe waste water closure protection device installed in a drain.

Figure 4:
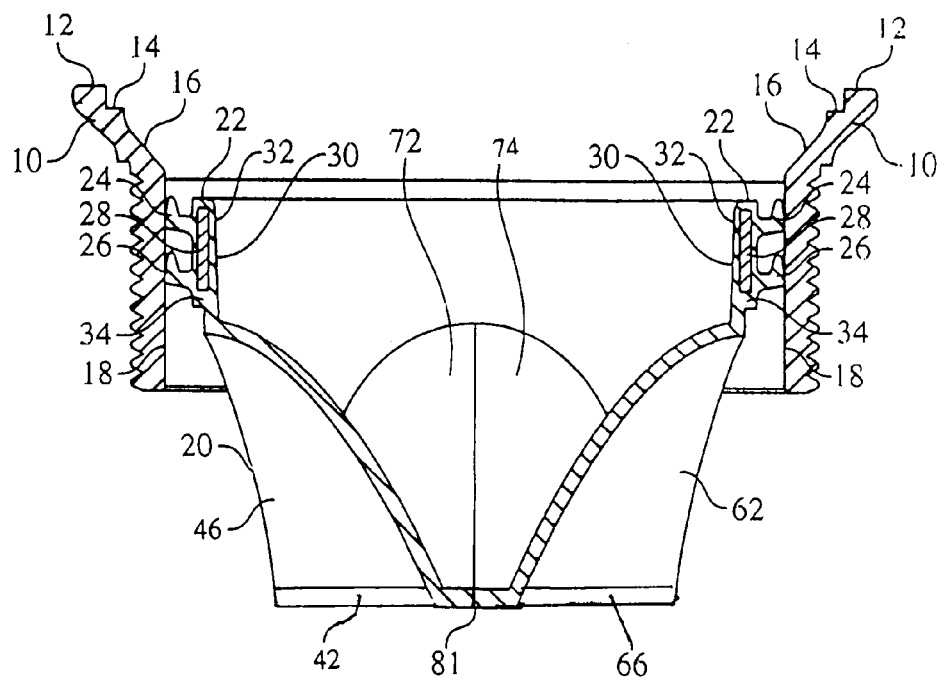

FIG. 4 is a cross-section of an embodiment drain pipe waste water closure protection device installed in a drain taken along line 4-4 of FIG. 3.

Figure 5:
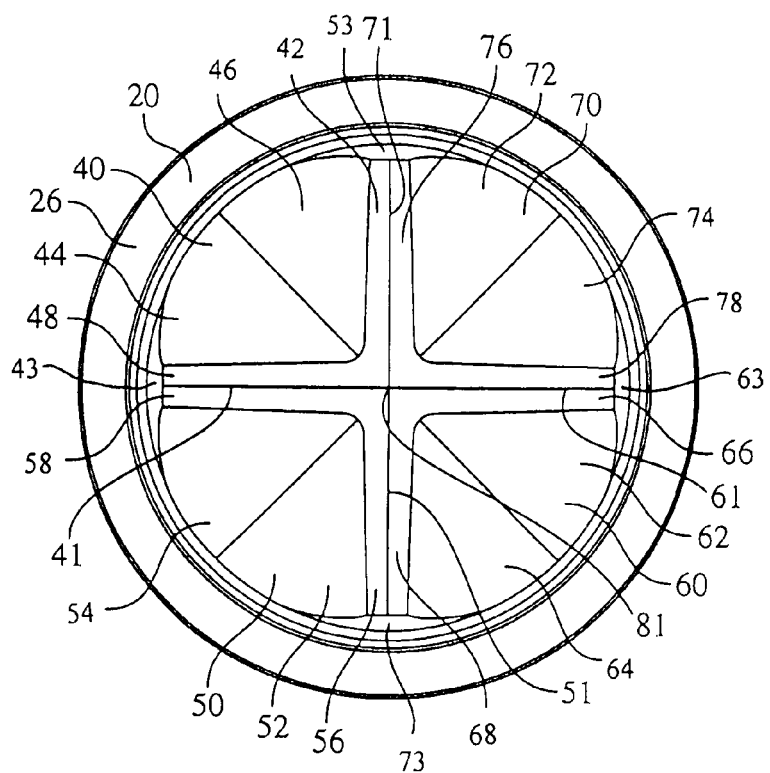

FIG. 5 is a bottom view of an embodiment drain pipe waste water closure protection device.

Figure 2:
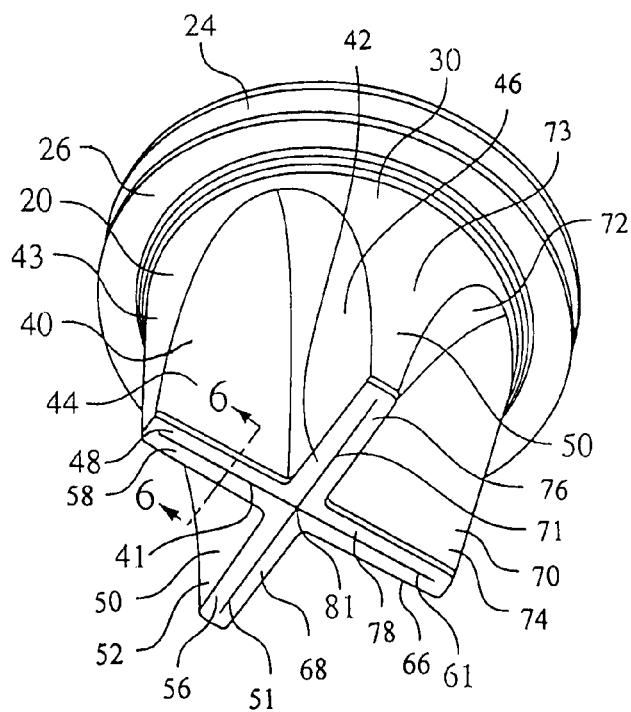
FIG. 2 is a perspective side view showing the bottom of an embodiment drain pipe waste water closure protection device.
Figure 6:
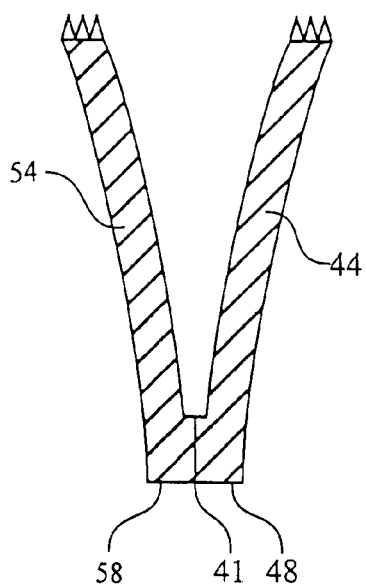

FIG. 6 is a partial cross-section of an embodiment drain pipe waste water closure protection device taken along line 6-6 of FIG. 2.

DETAILED DESCRIPTION OF THE INVENTION

In this disclosure, the following terms are used. "Waste water pipe" means a pipe leading from a drain to a sewer. "Drain pipe waste water closure protection device" means a seal structure located in a floor drain. "Water-containing pipe closure" means a generally U-shaped section of pipe containing water or another liquid located in a waste water pipe below a drain which prevents emission of gases from the waste water pipe through the drain.

"Pressure accumulating seal" means a seal manufactured of flexible material and comprised of two elliptical-parabolic double curved shaped pressure accumulating walls, each of which concentrates pressure exerted on the pressure accumulating wall on an attached force accumulating outlet closure, and which are each attached to a shoulder. The force accumulating outlet closures are together when the seal is closed and apart when the seal is open. A pressure accumulating seal is normally closed, blocking passage through the seal from either side.

"Quadruple pressure accumulating seal" means a seal comprised of four connected pressure accumulating seals.

Figure 1:
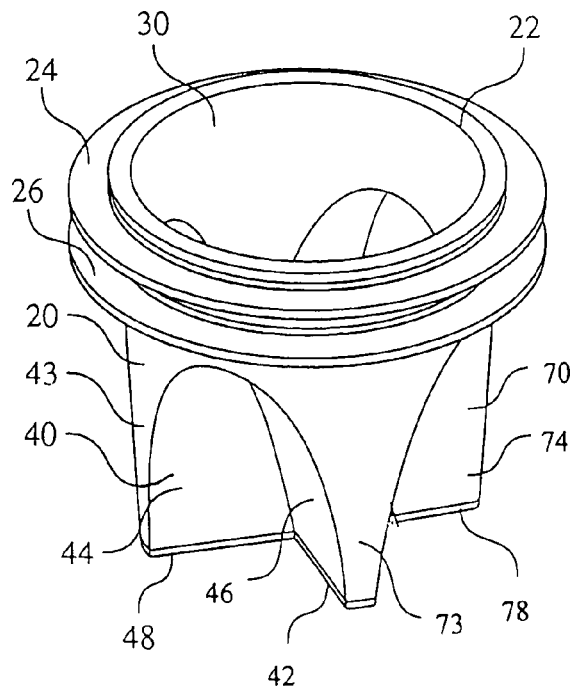
FIG. 1 is a perspective side view showing the top of an embodiment drain pipe waste water closure protection device.

FIG. 1 is a perspective side view showing the top of an embodiment drain pipe waste water closure protection device. FIG. 1 shows the exterior surfaces with the exception of the interior surface of the conical body 30. Visible in FIG. 1 is an embodiment drain pipe waste water closure protection device 20, rim 22 at the inlet of the conical body, upper radial disc seal 24, lower radial disc seal 26, and the conical body 30, both radial disc seals located near the inlet of the conical body. Also visible is the first elliptical-parabolic cross section, double curved shaped pressure accumulating wall 40 comprised of first left pressure accumulating wall 44, first left pressure accumulating wall, force accumulating outlet closure 48, first assembly right pressure accumulating wall 46 with attached first right pressure accumulating wall, force accumulating outlet closure 42. The fourth elliptical-parabolic cross section, double curved shaped pressure accumulating wall 70 is comprised of a fourth left pressure accumulating wall 72 (not visible in FIG. 1) with attached fourth left pressure accumulating wall, force accumulating outlet closure 76 (not visible in FIG. 1), fourth right pressure accumulating wall 74 with attached fourth right pressure accumulating wall, force accumulating outlet closure 78. The first left pressure accumulating wall 44 is attached on one side to the first right pressure accumulating wall 46. The first left pressure accumulating wall 44 is attached on the other side to the first shoulder 43, which in turn is connected to the conical body 30. The fourth left pressure accumulating wall 72 (not visible in FIG. 1) is attached on one side to the fourth right pressure accumulating wall 74. The fourth left pressure accumulating wall 72 (not visible in FIG. 1) is attached on the other side to the fourth shoulder 73, which in turn is connected to the conical body 30.

The convex shape of the surface and the elliptical-parabolic outer margins of each pressure accumulating wall interact to concentrate forces exerted on the pressure accumulating wall surface onto the force accumulating outlet closure s, forcing them together, thereby insuring an effective seal between the force accumulating outlet closures.

FIG. 2 is a perspective side view showing the bottom of an embodiment drain pipe waste water closure protection device comprising a quadruple pressure seal. FIG. 2 shows the exterior surfaces of the drain pipe waste water closure protection device 20. Visible in FIG. 2 is an upper radial disc seal 24, lower radial disc seal 26, and conical body 30, both radial disc seals located near the inlet of the conical body. Also visible is the first elliptical-parabolic cross section, double curved shaped pressure accumulating wall 40 comprised of first left pressure accumulating wall 44, first left pressure accumulating wall, force accumulating outlet closure 48, first assembly right pressure accumulating wall 46 with attached first right pressure accumulating wall, force accumulating outlet closure 42. The fourth elliptical-parabolic cross section, double curved shaped pressure accumulating wall 70 is comprised of a fourth left pressure accumulating wall 72 with attached fourth pressure accumulating wall left force accumulating outlet closure 76, fourth right pressure accumulating wall 74 with attached fourth right pressure accumulating wall, force accumulating outlet closure 78. Also visible in the third pressure accumulating wall, left force accumulating outlet closure 66 and the third right pressure accumulating wall, force accumulating outlet closure 68. The second elliptical-parabolic cross section, double curved shaped pressure accumulating wall 50 is comprised of a second left pressure accumulating wall 52 with attached second left pressure accumulating wall, force accumulating outlet closure 56, second right pressure accumulating wall 54 (not visible in FIG. 2) with attached second right pressure accumulating wall, force accumulating outlet closure 58. The first left pressure accumulating wall 44 is attached on one side to the first right pressure accumulating wall 46. The first left pressure accumulating wall 44 is attached on the other side to the first shoulder 43, which in turn is connected to the conical body 30. The fourth left pressure accumulating wall 72 is attached on one side to the fourth right pressure accumulating wall 74. The fourth left pressure accumulating wall 72 is attached on the other side to the fourth shoulder 73, which in turn is connected to the conical body 30. Although not shown in FIG. 2, the components of the second pressure accumulating wall and third pressure accumulating wall are connected to each other and to the second 53 and third 63 shoulders (both not visible in FIG. 2) in similar fashion. Seal 41 is formed by reversible interaction of force accumulating outlet closures 48 and 58. Seal 51 is formed by reversible interaction of force accumulating outlet closures 52 and 68. Seal 61 is formed by reversible interaction of force accumulating outlet closures 66 and 78. Seal 71 is formed by reversible interaction of force accumulating outlet closures 42 and 76. All four pressure accumulating wall seals intersect at the center 81.

FIG. 3 is a top view of an embodiment drain pipe waste water closure protective device installed in a floor drain. Visible in FIG. 3 is an embodiment floor drain 10 without a drain strainer. Visible is a top rim 12 of the floor drain, a recess 14 for a drain strainer, a sloping drain mouth 16, which connects with a vertical drain wall (not visible in FIG. 3). Features of the drain pipe waste water closure protection device 20 visible in FIG. 3 are the internal surfaces, with the exception of the rim 22.

Visible in FIG. 3 is the upper radial disc seal 24. Also visible is the first pressure accumulating wall 40 components, first left pressure accumulating wall 44, first left pressure accumulating wall, force accumulating outlet closure 48, first right pressure accumulating wall 46, and first right pressure accumulating wall force accumulating outlet closure 42. Also visible is the second pressure accumulating wall 50 components, second left pressure accumulating wall, 52, second left pressure accumulating wall, force accumulating outlet closure 56, second right pressure accumulating wall 54, and second right pressure accumulating wall, force accumulating outlet closure 58. Also visible is the third pressure accumulating wall 60 components, third left pressure accumulating wall 62, third left pressure accumulating wall, force accumulating outlet closure 66, third right pressure accumulating wall 64, and third right pressure accumulating wall, force accumulating outlet closure 68. Also visible is the fourth pressure accumulating wall 70 components, fourth left pressure accumulating wall 72, fourth left pressure accumulating wall, force accumulating outlet closure 76, fourth right pressure accumulating wall 74, and fourth right pressure accumulating wall, force accumulating outlet closure 78. A seal 41 is formed by the first left pressure accumulating wall, force accumulating outlet closure 48 and second right pressure accumulating wall, force accumulating outlet closure 58. A seal 51 is formed by the second left pressure accumulating wall, force accumulating outlet closure 56 and the third right pressure accumulating wall, force accumulating outlet closure 68. A seal 61 is formed by the third left pressure accumulating wall, force accumulating outlet closure 66 and the fourth right pressure accumulating wall, force accumulating outlet closure 78. A seal 71 is formed by the fourth left pressure accumulating wall, force accumulating outlet closure 76 and the first right pressure accumulating wall, force accumulating outlet closure 42. The seals meet at the center of the drain pipe waste water closure protection device 81.

FIG. 4 is a cross-section of an embodiment drain pipe waste water closure protection device installed in a drain taken along line 4-4 of FIG. 3. Visible in FIG. 4 is an embodiment floor drain 10 without a drain strainer. Visible is a top rim 12 of the floor drain, a recess 14 for a drain strainer, a sloping drain mouth 16, which connects with a vertical drain wall 18 which connects with a drain pipe (not shown in FIG. 4). Features of the drain pipe waste water closure protection device 20 visible in FIG. 3 are the internal surfaces plus the rim 22. Visible in the embodiment drain pipe waste water closure protection device in cross section in FIG. 4 is the drain pipe waste water closure protection device rim 22, conical body 30, inlet 32 of the conical body, and outlet 34 of the conical body. Also visible is the upper radial disc seal 24 and the lower radial disc seal 26. The radial disc seals are shown bent upward by contact with the vertical drain wall 18. Also visible is the radial compression cylinder 28 located in the conical body 30 and underlying the radial disc seals 24 and 26. Also visible are the fourth left pressure accumulating wall 72 and the fourth right pressure accumulating wall 74. The first right pressure accumulating wall 46 and attached first right pressure accumulating wall, force accumulating outlet closure 42 are shown. The third left pressure accumulating wall 62 and attached third left pressure accumulating wall, force accumulating outlet closure 66 are also show. All four pressure accumulating wall seals intersect at 81.

FIG. 5 is a bottom view of an embodiment drain pipe waste water closure protection device 20. Visible in FIG. 5 is a lower radial disc seal 26. Also visible is the first elliptical-parabolic cross section, double curved shaped pressure accumulating wall 40 components, first left pressure accumulating wall 44, first left pressure accumulating wall, force accumulating outlet closure 48, first right pressure accumulating wall 46, and first right pressure accumulating wall, force accumulating outlet closure 42. Also visible is the second elliptical-parabolic cross section, double curved shaped pressure accumulating wall 50 components, second left pressure accumulating wall 52, second left pressure accumulating wall, force accumulating outlet closure 56, second right pressure accumulating wall 54, and second right pressure accumulating wall, force accumulating outlet closure 58. Also visible is the third elliptical-parabolic cross section, double curved shaped pressure accumulating wall 60 components, third left pressure accumulating wall 62, third left pressure accumulating wall, force accumulating outlet closure 66, third right pressure accumulating wall 64, and third right pressure accumulating wall, force accumulating outlet closure 68. Also visible is the fourth elliptical-parabolic cross section, double curved shaped pressure accumulating wall 70 components, fourth left pressure accumulating wall 72, fourth left pressure accumulating wall, force accumulating outlet closure 76, fourth right pressure accumulating wall 74, and fourth right pressure accumulating wall, force accumulating outlet closure 78. A seal 41 is formed by the first left pressure accumulating wall, force accumulating outlet closure 48 and second right pressure accumulating wall, force accumulating outlet closure 58. A seal 51 is formed by the second left pressure accumulating wall, force accumulating outlet closure 56 and the third right pressure accumulating wall, force accumulating outlet closure 68. A seal 61 is formed by the third left pressure accumulating wall, force accumulating outlet closure 66 and the fourth right pressure accumulating wall, force accumulating outlet closure 78. A seal 71 is formed by the fourth left pressure accumulating wall, force accumulating outlet closure 76 and the first right pressure accumulating wall, force accumulating outlet closure 42. The seals meet at the center of the drain pipe waste water closure protection device 81. Also visible is the first shoulder 43, second shoulder 53, third shoulder 63, and fourth shoulder 73.

FIG. 6 is a partial cross-section of an embodiment drain pipe waste water closure protection device taken along line 6-6 of FIG. 2. Visible in FIG. 6 is a second right pressure accumulating wall 54 with attached second right pressure accumulating wall, force accumulating outlet closure 58, and the first left pressure accumulating wall 44 with attached first left pressure accumulating wall, force accumulating outlet closure 48. Interaction between the force accumulating outlet closures form a reversible seal 41.

Embodiment drain pipe waste water closure protection devices are made with the conical body, ring seals, or pressure accumulating seal comprised of any suitable soft, flexible, resilient material. Embodiments are made of acrylonitrile-butadiene rubber, polychloroprene, fluoroelastomers, ethylene propylene diene monomer, polyvinyl chloride, polyvinyl alcohol, high molecular weight polyethylene, perfluoroalkoxy polymer resin, fluorinated ethylene-propylene, or polytetrafluoroethylene. All materials of construction may be imbibed with adhesion prevention additive using compounds such as molybdenum sulfide or polytetrafluoroethylene.

Embodiments are made with the conical body, ring seals, or pressure accumulating seal comprised of acrylonitrile-butadiene rubber imbibed with adhesion prevention additive with molybdenum disulfide.

Embodiment drain pipe waste water closure protection devices are comprised of the conical body, ring seals, and pressure accumulating seal are collectively comprised of a single piece of material. In other embodiments the conical body, ring seals, or pressure accumulating seal are separately manufactured and subsequently assembled into an intact drain pipe waste water closure protection device.

Embodiment drain pipe waste water closure protection devices include a corrosion resistant, radial compression cylinder comprised of any suitable strong, hard, resilient material. Embodiments are manufactured of iron, stainless steel, cold rolled steel, cobalt, nickel, copper, or alloys thereof, or polystyrene, polyvinyl chloride, polypropylene, polyethylene, acrylonitrile butadiene styrene, polycarbonate, or polyamide.

Embodiment drain pipe waste water closure protection devices are intended for use with floor drain pipe waste water closure s. They act as a backup safety device to prevent backflow of gases or liquids from the waste water pipe into the structure. The primarily drain seal which prevents sewer gas backflow is a U-shaped water-filled pipe waste water closure in the waste water pipe below the drain pipe waste water closure protection device. Embodiments also help preserve the integrity of the primary drain seal by preventing air leakage or evaporation of water or other liquid from the primary drain seal.

Embodiment drain pipe waste water closure protection devices allow the flow of drainage to enter the plumbing drainage system without any undo reduction in flow capacity, in particular, embodiment drain pipe waste water closure protection devices open when there is 4 ounces or more of water in the drain and close at a downstream pressure of liquid or gases from the waste water pipe equal to or higher than atmospheric pressure. Embodiment drain pipe waste water closure protection devices also allow access to the primary drain seal for cleaning or inspection.

Embodiment drain pipe waste water closure protection devices include quadruple pressure accumulating seals. Such embodiments provide a greater diameter than simple pressure accumulating seals for maximum passage of liquids through the drain. In addition, quadruple pressure accumulating seals allow a maximum diameter opening for inspection and maintenance of the primary drain seal.

Embodiment drain pipe waste water closure protection devices protection devices are compliant with industry standards.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

I claim:

1. A drain pipe waste water closure protection device comprising:
   a conical body having first an inlet and then an outlet,
   a corrosion resistant, radial compression cylinder embedded in the conical body near the inlet,
   the corrosion resistant, radial compression cylinder comprised of a strong, hard, resilient material,
   two radial disc seals near the inlet of the conical body,
   the corrosion resistant, radial compression cylinder underlying the two radial disc seals,
   a quadruple pressure accumulating seal comprised of four pressure accumulating walls,
   each pressure accumulating wall comprised of an elliptical-parabolic double curved shaped pressure accumulating wall comprised of two pressure accumulating walls with attached force accumulating outlet closures attached to the outlet of the conical body, wherein each force accumulating outlet closure interacts with an adjacent force accumulating outlet closure in a reversible sealing relationship, and
   the conical body, radial disc seals, and quadruple pressure accumulating seal manufactured of an imbibed with adhesion prevention additive elastomer.

2. A drain trap evaporation protection device comprising:
   a conical body having a drain water inlet and a drain water outlet,
   a radial compression cylinder embedded in the conical body near the drain water inlet,
   the radial compression cylinder comprised of stainless steel,
   two radial disc seals near the drain water inlet of the conical body,
   the radial compression cylinder underlying the two radial disc seals,
   A quadruple pressure accumulating seal comprised of four elliptical-parabolic double curved shaped pressure accumulating wall assemblies attached to the outlet of the conical body, assembly comprised of an elliptical-parabolic double curved shaped pressure accumulating wall body comprised of a pressure accumulating wall shoulder, a left pressure accumulating wall, and a right pressure accumulating wall with a force accumulating outlet closure attached to each pressure accumulating wall, wherein each force accumulating outlet closure is capable of interaction with an adjacent force accumulating outlet closure of an adjacent pressure accumulating wall body in a reversible sealing relationship,
   the conical body, radial disc seals, and quadruple pressure accumulating seal collectively manufactured of a single piece of acrylonitrile-butadiene imbibed with molybdenum disulfide,
   the drain trap evaporation protection device capable of mounting in a drain having a drain wall and the drain attached to a waste water pipe,
   the radial disc seals capable of having a sealing relationship with the drain wall,
   the drain trap evaporation protection device capable of allowing gas or fluid flow through the drain into the waste water pipe when there is three ounces or more of water in the drain, and
   the drain trap evaporation protection device capable of blocking backflow of gas or fluid from the waste water pipe into the drain when the pressure in the waste water pipe is equal to or higher than atmospheric pressure.

3. A drain pipe waste water closure protection device comprising:
   a conical body having a drain water inlet and a drain water outlet,
   a corrosion resistant, radial compression cylinder embedded in the conical body near the inlet,
   the corrosion resistant, radial compression cylinder comprised of a strong, hard, resilient material,
   two soft, flexible, resilient radial disc seals near the inlet of the conical body,
   the corrosion resistant, radial compression cylinder underlying the one or more radial disc seals,
   a quadruple pressure accumulating seal at the outlet of the conical body, and
   all elements of the drain pipe waste water closure protection device except the compression cylinder manufactured of an elastomer imbibed with an adhesion prevention additive wherein the quadruple pressure accumulating seal is comprised of four elliptical-parabolic double curved shaped pressure accumulating walls, each pressure accumulating wall comprised of two pressure accumulating walls, each pressure accumulating wall having an attached force accumulating outlet closure, wherein each force accumulating outlet closure interacts with an adjacent force accumulating outlet closure in a reversible sealing relationship.

* * * * *